US011881918B2

(12) United States Patent
Lee et al.

(10) Patent No.: US 11,881,918 B2
(45) Date of Patent: Jan. 23, 2024

(54) METHOD AND APPARATUS FOR MODULAR MIMO SYSTEM AND CSI FEEDBACK

(71) Applicant: Samsung Electronics Co., Ltd., Suwon-si (KR)

(72) Inventors: Gilwon Lee, McKinney, TX (US); Jeongho Jeon, San Jose, CA (US); Ahmed Atef Ibrahim Ibrahim, Plano, TX (US); Jianzhong Zhang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 229 days.

(21) Appl. No.: 17/527,040

(22) Filed: Nov. 15, 2021

(65) Prior Publication Data
US 2022/0255602 A1    Aug. 11, 2022

Related U.S. Application Data

(60) Provisional application No. 63/197,731, filed on Jun. 7, 2021, provisional application No. 63/146,482, filed on Feb. 5, 2021.

(51) Int. Cl.
*H04B 7/06* (2006.01)
*H04B 7/0417* (2017.01)

(52) U.S. Cl.
CPC ......... *H04B 7/0626* (2013.01); *H04B 7/0417* (2013.01); *H04B 7/0634* (2013.01)

(58) Field of Classification Search
None
See application file for complete search history.

(56) References Cited

U.S. PATENT DOCUMENTS 10,715,237 B1    7/2020  Landis et al.
2010/0279625 A1*  11/2010  Ko ................... H04B 7/0691
                                                                  455/68
2013/0322283 A1  12/2013  Cheng
(Continued)

OTHER PUBLICATIONS

"3rd Generation Partnership Project; Technical Specification Group Radio Access Network; Evolved Universal Terrestrial Radio Access (E-UTRA); Physical channels and modulation (Release 16)", 3GPP TS 36.211 V16.4.0, Dec. 2020, 249 pages.
(Continued)

*Primary Examiner* — Minh Trang T Nguyen

(57) ABSTRACT

Methods and apparatuses for modular MIMO system and CSI feedback in a wireless communication system. The methods and apparatuses include: identifying configuration information of an antenna system including antenna modules for a MIMO operation; identifying, based on the configuration information, a number of collocated antenna groups that each includes one or more of the antenna modules; identifying, based on the configuration information, a number of the antenna modules for each type of the antenna modules in each of the collocated antenna groups, wherein each of the collocated antenna groups includes one or more types of the antenna modules; generating a CSI report for one or more of the collocated antenna groups in the antenna system; and transmitting, to a BS, the CSI report.

20 Claims, 10 Drawing Sheets

(56) References Cited

U.S. PATENT DOCUMENTS

2019/0312614 A1 10/2019 Kim et al.
2019/0341979 A1 11/2019 Gao et al.
2020/0228281 A1 7/2020 Choi et al.

OTHER PUBLICATIONS

"3rd Generation Partnership Project; Technical Specification Group Radio Access Network; Evolved Universal Terrestrial Radio Access (E-UTRA); Multiplexing and channel coding (Release 16)", 3GPP TS 36.212 V16.4.0, Dec. 2020, 254 pages.
"LTE; Evolved Universal Terrestrial Radio Access (E-UTRA); Physical layer procedures (3GPP TS 36.213 version 16.4.0 Release 16)", ETSI TS 136 213 V16.4.0, Feb. 2021, 577 pages.
"3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321 V16.3.0, Dec. 2020, 142 pages.
"LTE; Evolved Universal Terrestrial Radio Access (E-UTRA); Radio Resource Control (RRC); Protocol specification (3GPP TS 36.331 version 16.3.0 Release 16)", ETSI TS 136 331 V16.3.0, Jan. 2021, 1089 pages.
"3rd Generation Partnership Project; Technical Specification Group Radio Access Network; NR; Physical channels and modulation (Release 16)", 3GPP TS 38.211 v16.4.0, Dec. 2020, 133 pgs.
"3rd Generation Partnership Project; Technical Specification Group Radio Access Network; NR; Multiplexing and channel coding (Release 16)", 3GPP TS 38.212 v16.4.0, Dec. 2020, 152 pgs.
"3rd Generation Partnership Project; Technical Specification Group Radio Access Network; NR; Physical layer procedures for control (Release 16)", 3GPP TS 38.213 v16.4.0, Dec. 2020, 181 pgs.
"3rd Generation Partnership Project; Technical Specification Group Radio Access Network; NR; Physical layer procedures for data (Release 16)", 3GPP TS 38.214 v16.4.0, Dec. 2020, 169 pgs.
"5G; NR; Physical layer measurements; (3GPP TS 38.215 version 16.4.0 Release 16)", ETSI TS 138 215 V16.4.0, Jan. 2021, 31 pages.
"3rd Generation Partnership Project; Technical Specification Group Radio Access Network; NR; Medium Access Control (MAC) protocol specification (Release 16)", 3GPP TS 38.321 v16.3.0, Dec. 2020, 156 pgs.
"3rd Generation Partnership Project; Technical Specification Group Radio Access Network; NR; Radio Resource Control (RRC) protocol specification (Release 16)", 3GPP TS 38.331 v16.3.1, Jan. 2021, 932 pgs.
International Search Report and Written Opinion dated May 3, 2022 regarding Application No. PCT/KR2022/001755, 3 pages.

\* cited by examiner

METHOD AND APPARATUS FOR MODULAR MIMO SYSTEM AND CSI FEEDBACK

CROSS-REFERENCE TO RELATED APPLICATIONS AND CLAIM OF PRIORITY

The present application claims priority to U.S. Provisional Patent Application No. 63/146,482, filed on Feb. 5, 2021, and U.S. Provisional Patent Application No. 63/197,731, filed on Jun. 7, 2021. The contents of the above-identified patent documents are incorporated herein by reference.

TECHNICAL FIELD

The present disclosure relates generally to wireless communication systems and, more specifically, the present disclosure relates to modular multi-input multi-output (MIMO) system and channel state information (CSI) feedback in communication systems.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to modular MIMO system and CSI feedback in communication systems.

In one embodiment, a user equipment (UE) in a wireless communication system is provided. The UE comprises a processor configured to: identify configuration information of an antenna system including antenna modules for a multi-input multi-output (MIMO) operation; identify, based on the configuration information, a number of collocated antenna groups that each includes one or more of the antenna modules; identify, based on the configuration information, a number of the antenna modules for each type of the antenna modules in each of the collocated antenna groups, wherein each of the collocated antenna groups includes one or more types of the antenna modules; and generate a channel state information (CSI) report for one or more of the collocated antenna groups in the antenna system. The UE further includes a transceiver operably coupled to the processor, the transceiver configured to transmit, to a base station (BS), the CSI report.

In another embodiment, a method of a UE in a wireless communication system is provided. The method comprises: identifying configuration information of an antenna system including antenna modules for a MIMO operation; identifying, based on the configuration information, a number of collocated antenna groups that each includes one or more of the antenna modules; identifying, based on the configuration information, a number of the antenna modules for each type of the antenna modules in each of the collocated antenna groups, wherein each of the collocated antenna groups includes one or more types of the antenna modules; and generating a CS) report for one or more of the collocated antenna groups in the antenna system; and transmitting, to a BS, the CSI report.

In yet another embodiment, a BS in a wireless communication system is provided. The BS comprises a processor configured to generate configuration information of an antenna system including antenna modules for a MIMO operation. The BS further comprises a transceiver operably coupled to the processor, the transceiver configured to: transmit, to a UE, the configuration information of the antenna system including the antenna modules for the MIMO operation; and receive, from the UE, a CSI report for one or more of collocated antenna groups in the antenna system, wherein a number of the collocated antenna groups that each includes one or more of the antenna modules is identified based on the configuration information, and a number of the antenna modules for each type of the antenna modules in each of the collocated antenna groups is identified based on the configuration information, each of the collocated antenna groups including one or more types of the antenna modules.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
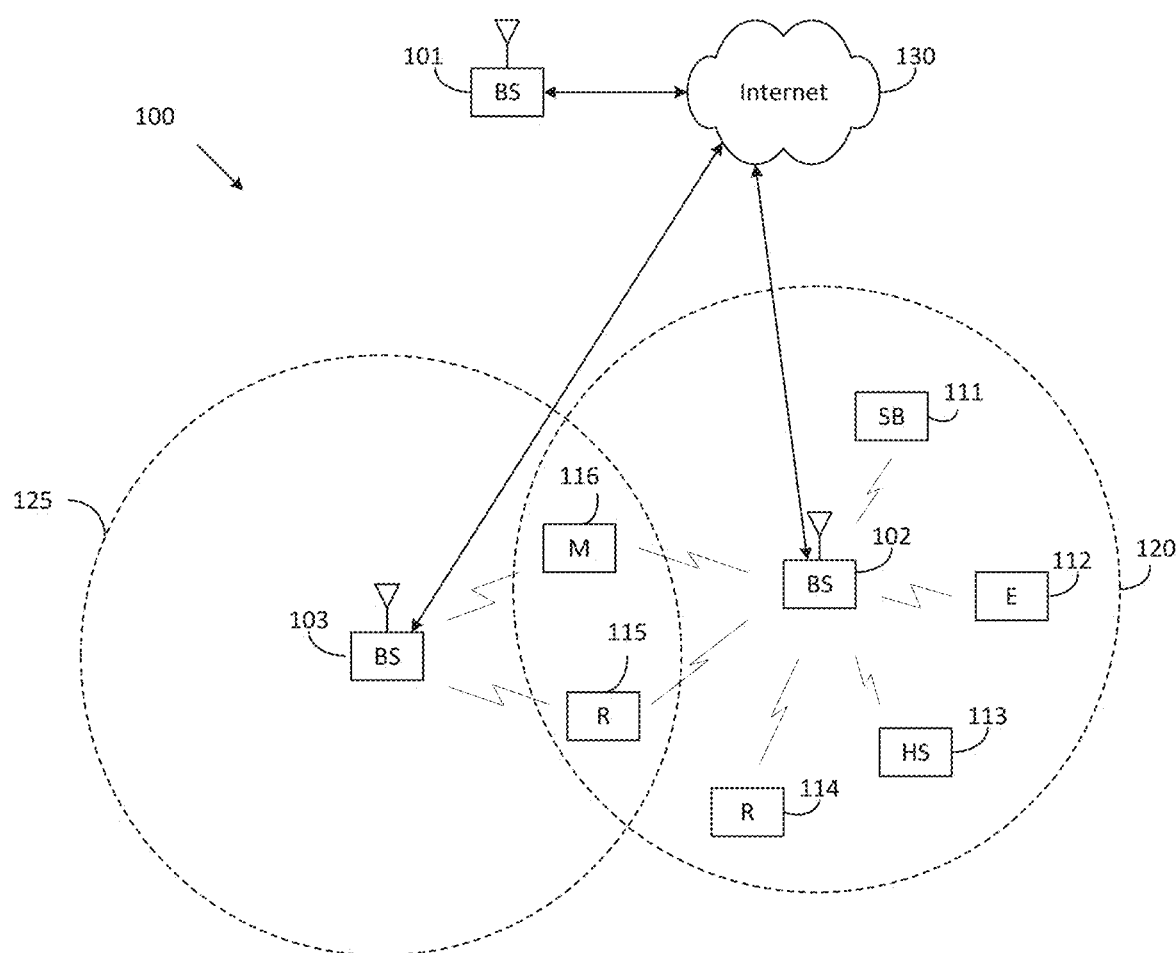
FIG. 1 illustrates an example wireless network according to embodiments of the present disclosure.
Figure 2:
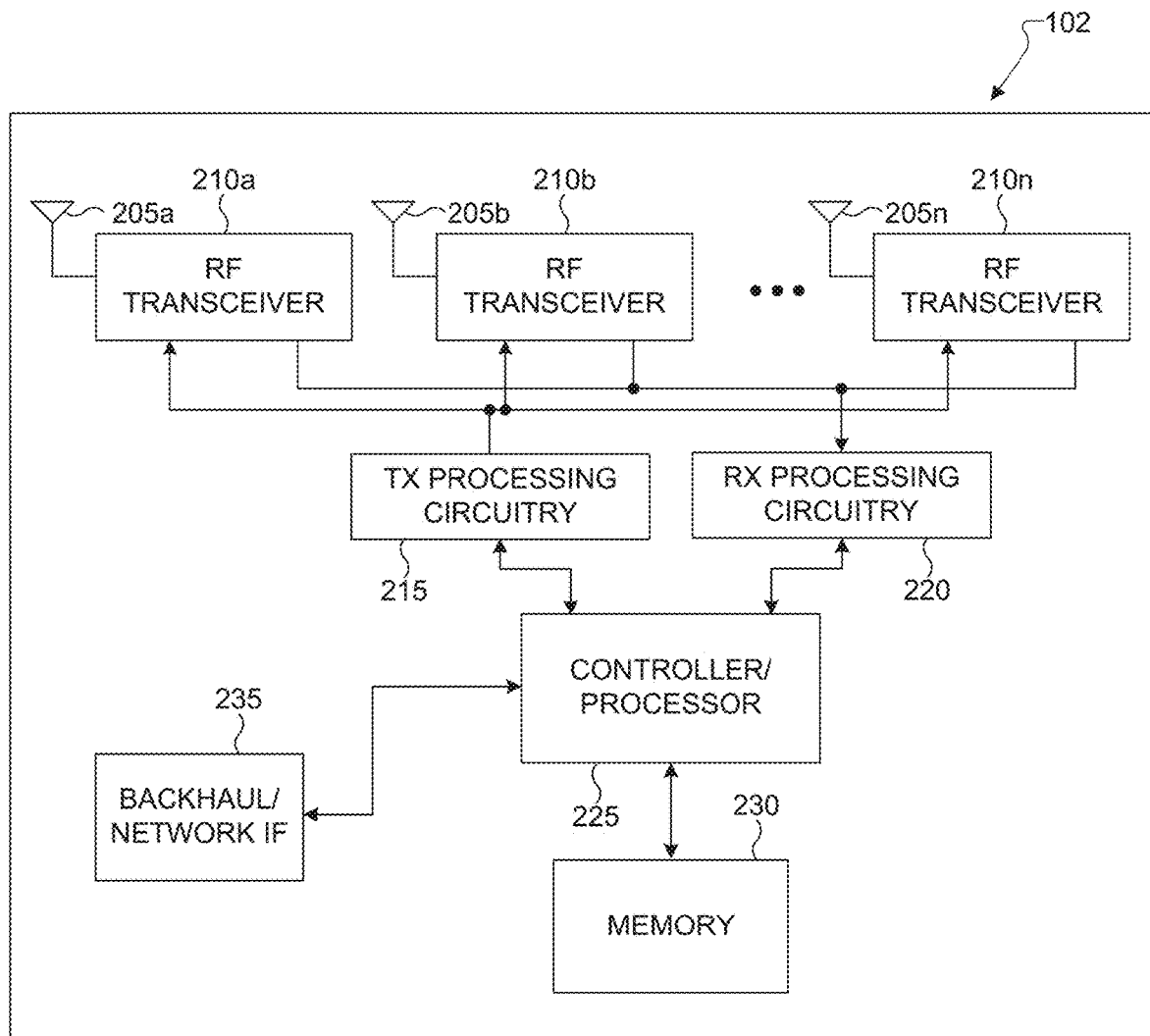
FIG. 2 illustrates an example gNB according to embodiments of the present disclosure.
Figure 3:
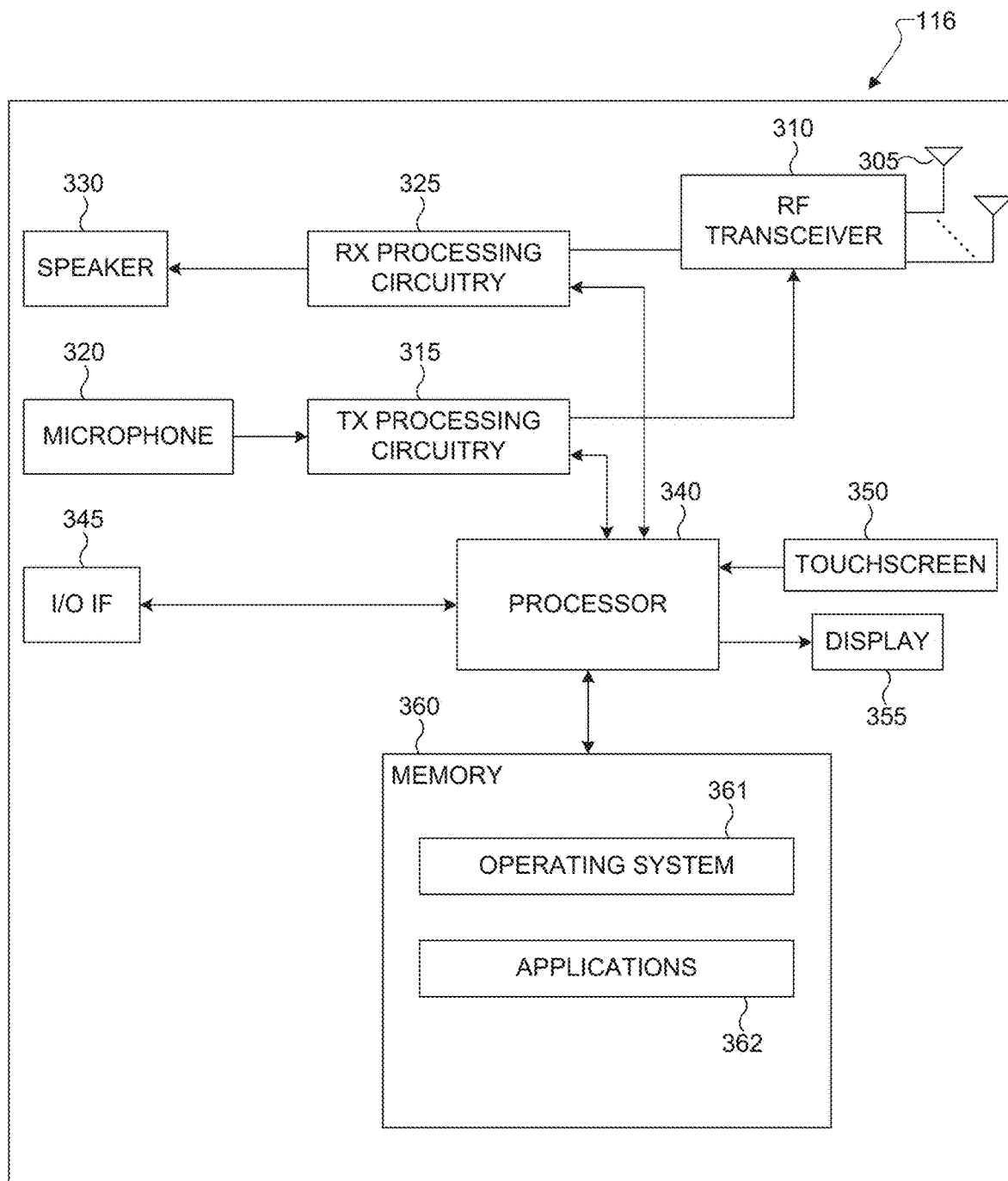
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "gNB" can refer to any component (or collection of components) configured to provide remote terminals with wireless access to a network, such as base transceiver station, a radio base station, transmit point (TP), transmit-receive point (TRP), a ground gateway, an airborne gNB, a satellite system, mobile base station, a macrocell, a femtocell, a WiFi access point (AP) and the like. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to equipment that wirelessly accesses a gNB. The UE could be a mobile device or a stationary device. For example, UE could be a mobile telephone, smartphone, monitoring device, alarm device, fleet management device, asset tracking device, automobile, desktop computer, entertainment device, infotainment device, vending machine, electricity meter, water meter, gas meter, security device, sensor device, appliance etc.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for modular MIMO system and CSI feedback in a wireless communication system. In certain embodiments, and one or more of the gNBs 101-103 includes circuitry, programming, or a combination thereof, for modular MIMO system and CSI feedback in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support modular MIMO system and CSI feedback in a wireless communication system. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for modular MIMO system and CSI feedback in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive MIMO, full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

Figure 4:
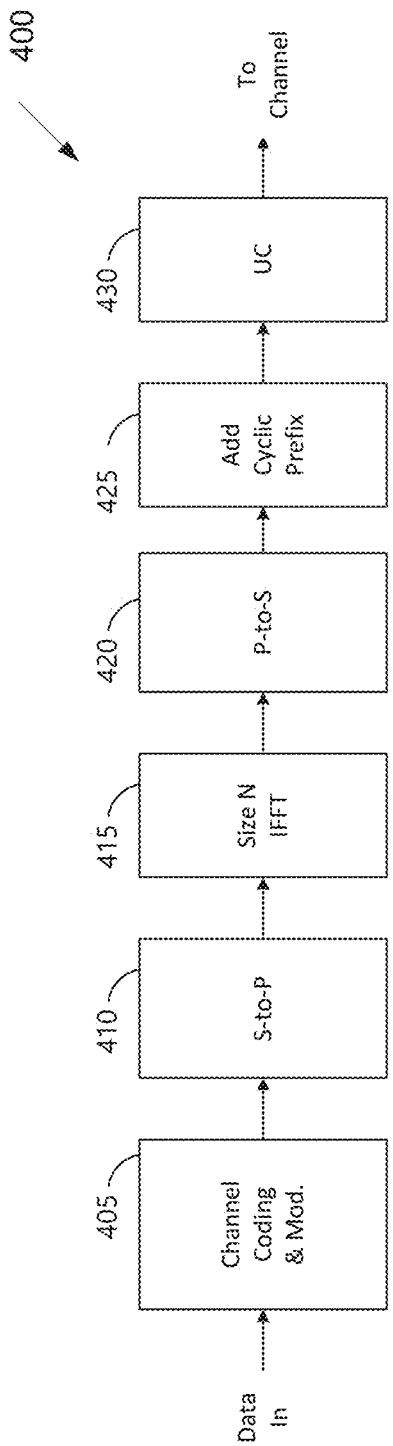
FIGS. 4 and 5 illustrate example wireless transmit and receive paths according to this disclosure.
Figure 5:
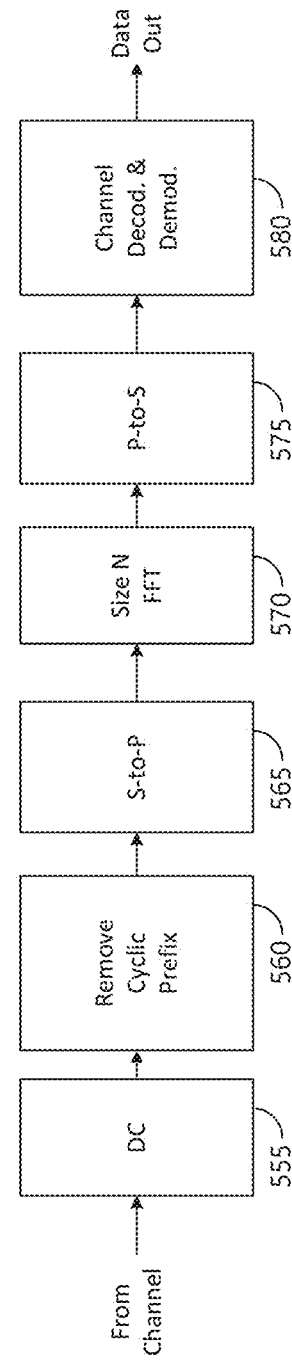

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Figure 6:
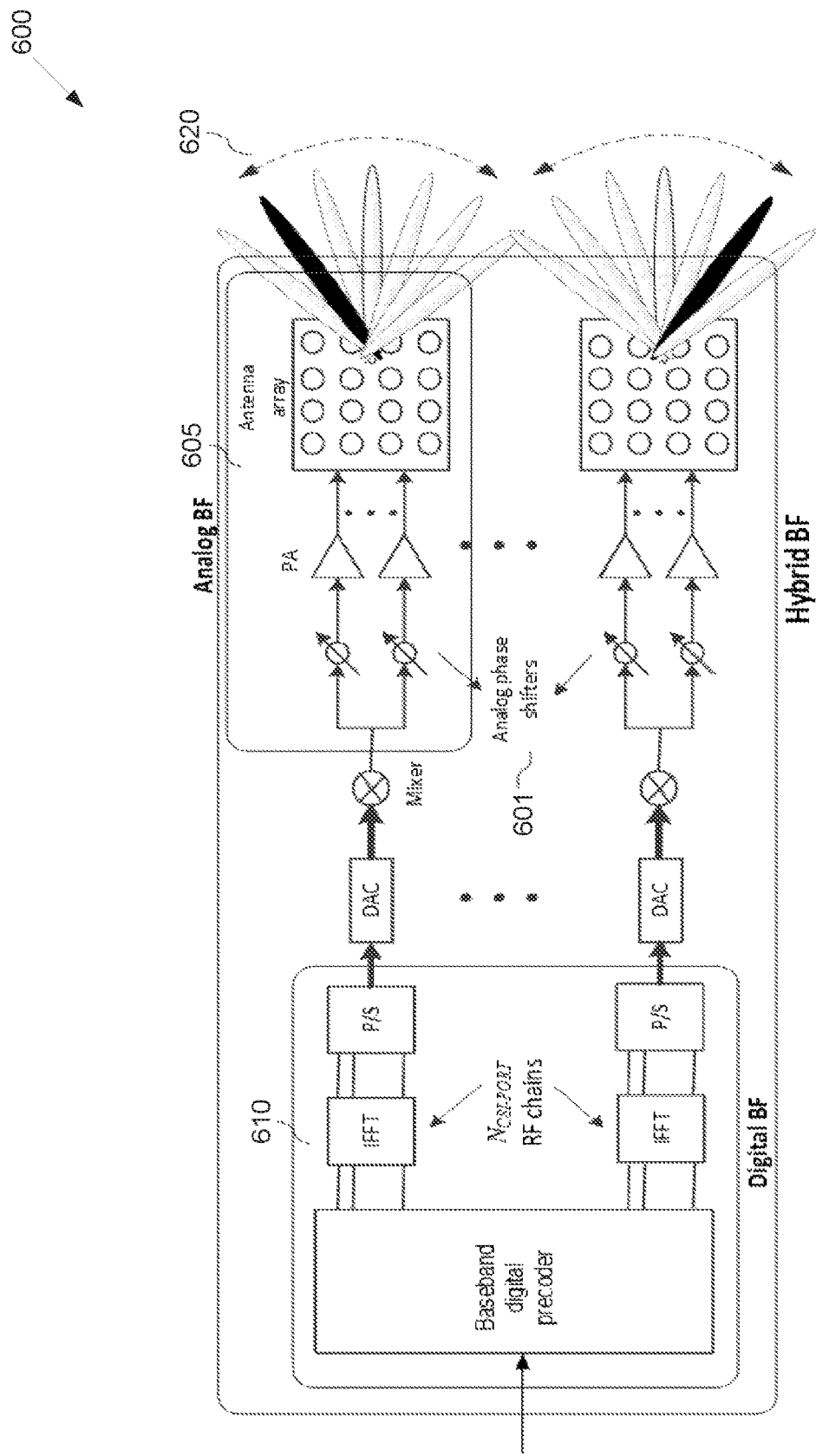
FIG. 6 illustrates an example beamforming architecture according to embodiments of the present disclosure.

FIG. 6 illustrates an example beamforming architecture 600 according to embodiments of the present disclosure. An embodiment of the beamforming architecture 600 shown in FIG. 6 is for illustration only.

3GPP standard specification Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 6.

The term "unit," as used in the present embodiment means software or a hardware component, such as an FPGA or an ASIC, and the "unit" performs specific tasks. However, the term "unit" does not mean that it is limited to software or hardware. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units". Furthermore, the components and "units" may be implemented to operate on one or more CPUs within a device or a security multimedia card.

In this case, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles (620) by varying the phase shifter bank across symbols or subframes. The number of sub-arrays (equal to the number of RF chains) is the same as the number of CSI-RS ports $N_{CSI\text{-}PORT}$. A digital beamforming unit 610 performs a linear combination across $N_{CSI\text{-}PORT}$ analog beams to further increase precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting," respectively), and receiving a DL or UL transmission via a selection of a corresponding receive (RX) beam.

The above system is also applicable to higher frequency bands such as >52.6 GHz (also termed the FR4). In this case, the system can employ only analog beams. Due to the O2 absorption loss around 60 GHz frequency (~10 dB additional loss @100 m distance), larger number of and sharper analog beams (hence larger number of radiators in the array) will be needed to compensate for the additional path loss.

At lower frequency bands such as <1 GHz, on the other hand, the number of antenna elements may not be large in a given form factor due to the large wavelength. As an example, for the case of the wavelength size ($\lambda$) of the center frequency 600 MHz (which is 50 cm), it requires 4 m for uniform-linear-array (ULA) antenna panel of 16 antenna elements with the half-wavelength distance between two adjacent antenna elements. Considering a plurality of antenna elements is mapped to one digital port in practical cases, the required size for antenna panels at gNB to support a large number of antenna ports such as 32 CSI-RS ports becomes very large in such low frequency bands, and it leads the difficulty of deploying 2-D antenna element arrays in a conventional size of antenna form factor. This results in a limited number of CSI-RS ports that can be supported at a single site (location) and limit the spectral efficiency of such systems.

One possible approach to resolving the issue is to form multiple antenna panels (e.g., antenna modules, remote radio heads (RRHs)) with a small number of antenna ports instead of integrating all of the antenna ports in a single panel/site and to distribute the multiple panels in multiple locations/sites (or RRHs). The multiple antenna panels at multiple locations can still be connected to a single base unit, and thus the signal transmitted/received via multiple distributed panels can be processed in a centralized manner through the single base unit.

The present disclosure provides a new concept of MIMO deployment, namely modularized MIMO (or LEGO MIMO). The basic concept of the modularized MIMO is to define a basic antenna module (or multiple basic antenna modules) and to allow full flexibility for MIMO system to be formed using one or multiple basic antenna modules. In this disclosure, several components such as antenna module configuration, CSI codebook structure, and CSI reporting method, to support modularized MIMO operations are provided.

All the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodiments are applicable for UL transmission when the scheduling unit in time is either one subframe (which can consist of one or multiple slots) or one slot.

In the present disclosure, the frequency resolution (reporting granularity) and span (reporting bandwidth) of CSI reporting can be defined in terms of frequency "subbands" and "CSI reporting band" (CRB), respectively.

A subband for CSI reporting is defined as a set of contiguous physical resource blocks (PRBs) which represents the smallest frequency unit for CSI reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI reporting setting.

"CSI reporting band" is defined as a set/collection of subbands, either contiguous or non-contiguous, wherein CSI reporting is performed. For example, CSI reporting band can include all the subbands within the DL system bandwidth. This can also be termed "full-band." Alternatively, CSI reporting band can include only a collection of subbands within the DL system bandwidth. This can also be termed "partial band."

The term "CSI reporting band" is used only as an example for representing a function. Other terms such as "CSI reporting subband set" or "CSI reporting bandwidth" can also be used.

In terms of UE configuration, a UE can be configured with at least one CSI reporting band. This configuration can be semi-static (via higher-layer signaling or RRC) or dynamic (via MAC CE or L1 DL control signaling). When configured with multiple (N) CSI reporting bands (e.g., via RRC signaling), a UE can report CSI associated with n≤N CSI reporting bands. For instance, >6 GHz, large system bandwidth may require multiple CSI reporting bands. The value of n can either be configured semi-statically (via higher-layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with $M_n$ subbands when one CSI parameter for all the $M_n$ subbands within the CSI reporting band. A CSI parameter is configured with "subband" for the CSI reporting band with Mn subbands when one CSI parameter is reported for each of the $M_n$ subbands within the CSI reporting band.

In one embodiment of component I, codebook parameters are provided.

In embodiment I.1, a UE is configured with information about antenna system comprising of basic antenna module structure.

In embodiment I.1.1, a basic antenna module (or multiple basic antenna modules) follows the same structure of ($N_1$, $N_2$), where $N_1$ and $N_2$ are the number of antenna ports with the same polarization in the first and second dimensions, respectively.

Figure 7:
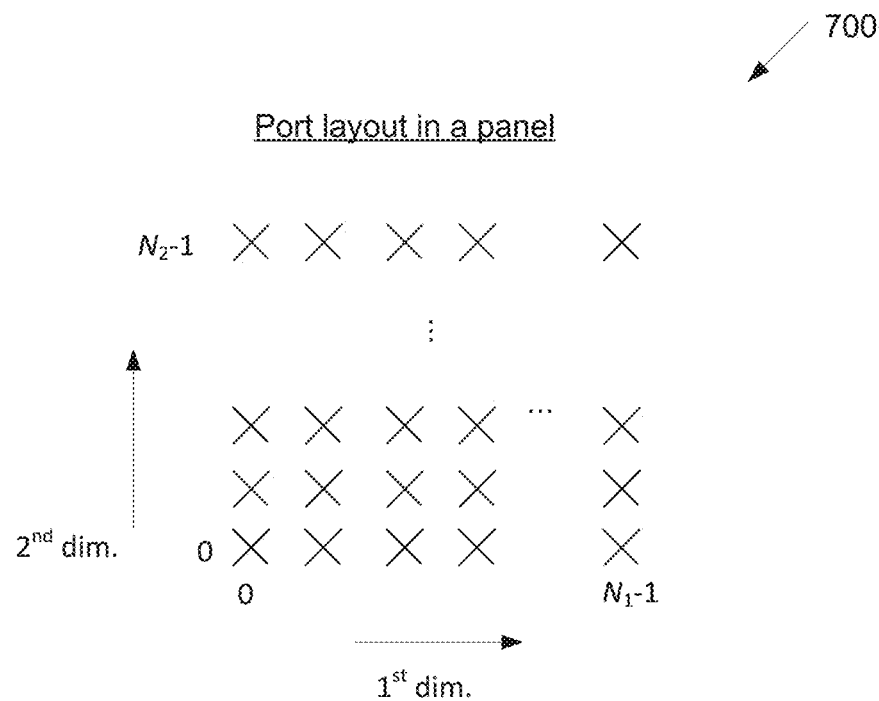
FIG. 7 illustrates an example antenna port layout according to embodiments of the present disclosure.

FIG. 7 illustrates an example antenna port layout 700 according to embodiments of the present disclosure. An embodiment of the antenna port layout 700 shown in FIG. 7 is for illustration only.

As illustrated in FIG. 7, "X" represents two antenna polarizations. In the present disclosure, the term "polarization" refers to a group of antenna ports. For example, antenna ports $$j = X + 0, X + 1, \ldots, X + \frac{P_{CSIRS}}{2} - 1$$

comprise a first antenna polarization, and antenna ports $$j = X + \frac{P_{CSIRS}}{2}, X + \frac{P_{CSIRS}}{2} + 1, \ldots, X + P_{CSIRS} - 1$$

comprise a second antenna polarization, where $P_{CSIRS}$ is a number of CSI-RS antenna ports and X is a starting antenna port number (e.g., X=3000, then antenna ports are 3000, 3001, 3002, . . . ). In the present disclosure, it may be assumed that the dual polarized set-up is considered wherein the total number of antenna ports is $N=2N_1N_2$, unless a co-polarized set-up is specifically mentioned.

In one example I.1.1.1, a basic antenna module is determined as a single basic unit, which can be represented by a single pair of $(N_1, N_2)$. For example, $(N_1, N_2)=(1, 1), (2, 2),$ or $(4, 4),$ and so on. In this case, once the single basic unit is defined in the specification, and a network (NW) and a UE have common understanding on it (this assumption itself should be written in the specification), no explicit indication is needed.

In one example I.1.1.2, a basic antenna module pair is defined as a single pair of basic units, which can be represented by two pairs of $(N_1, N_2)$. For example, a first pair is $(N_1, N_2)=(2, 1)$, and a second pair is $(N_1, N_2)=(1, 2)$. In this case, a single RRC (or MAC-CE/DCI) parameter (e.g., with one-bit size) is used to indicate the single basic unit pair. In one example, "0" of the RRC parameter indicates $(N_1, N_2)=(2, 1)$ and "1" of the RRC parameter indicates $(N_1, N_2)=(1, 2)$. In another example, the parameter of $(N_1, N_2)$ remains to be used to indicate the single basic unit pair.

In one example I.1.1.3, multiple basic antenna modules are defined as multiple basic units, which can be represented by multiple pairs of $(N_1, N_2)$. For example, a set comprising of multiple pairs of $(N_1, N_2)$ is used to indicate multiple basic units. In one example, the set is given by $S=\{(N_1, N_2)|(1, 1), (2, 1), (1, 2), (2, 2)\}$. In this case, a single RRC parameter with $\log_2|S|$ bits can be used to indicate each of the basic antenna modules in set S. In another example, the parameter of $(N_1, N_2)$ itself remains to be used to indicate each of the basic antenna modules in set S.

In one embodiment I.1.2, a basic antenna module (or multiple basic antenna modules) follows the structure of $(N_1, N_2)$ but has a single polarization (co-polarized antenna element), i.e., in this case, the total number of antenna ports is $N=N_1N_2$ (e.g., for dual polarization case, $N=2N_1N_2$).

In some examples I.1.2.1, 1.1.2.2, and I.1.2.3, a basic antenna module/multiple basic antenna modules is/are defined according to examples I.1.1.1, I.1.1.2, and I.1.1.3, respectively, under the single polarization set-up.

In one embodiment I.2, a UE is configured with the number(s) of basic antenna modules (or units, RRHs, panels), parameterized by $N_{module}$.

In one example I.2.1, the total number of basic antenna modules, $N_{module}$, is a value chosen from $\{1, 2, 3, \ldots, 32\}$. In another example, $N_{module}$ is a value chosen from $\{1, 2, 3, \ldots, 16\}$. In another example, $N_{module}$ is a value chosen from $\{2, 4, 8, 16\}$. In another example, $N_{module}$ is a value chosen from $\{1, 2, 3, \ldots, X\}$, where $$X = \frac{P_{CSI-RS,max}}{2N_1N_2}$$

for dual-polarized case $$\left(X = \frac{P_{CSI-RS,max}}{N_1N_2} \text{ for co-polarized case}\right)$$

and $P_{CSI-RS,max}$ is the maximum supported value of CSI-RS ports.

In one example I.2.2, the parameter $N_{module}$ is independently used to indicate the number of basic antenna modules for each type of antenna modules. In one example, if it assume that in the case of example I.1.1.2 (or I.1.2.2) for illustration purpose, $N_{module,V}$ is used to indicate the number of basic antenna modules for a first basic unit (e.g., $N_1, N_2)=(2,1)$), and $N_{module,H}$ is used to indicate the number of basic antenna modules for a second basic unit (e.g., $(N_1, N_2)=(1,2)$). In this case, $N_{module}=N_{module,V}+N_{module,H}$. (e.g., subscripts V and H stand for vertical antenna module and horizontal antenna module.) In another example, if it assumes that in the case of example I.1.1.3 (or I.1.2.3) for illustration purpose, $N_{module,i}$ is used to indicate the number of basic antenna modules for the i-th type of basic unit (e.g., the i-th element of S). In this case, $N_{module}=\Sigma_i N_{module,i}$.

Figure 8:
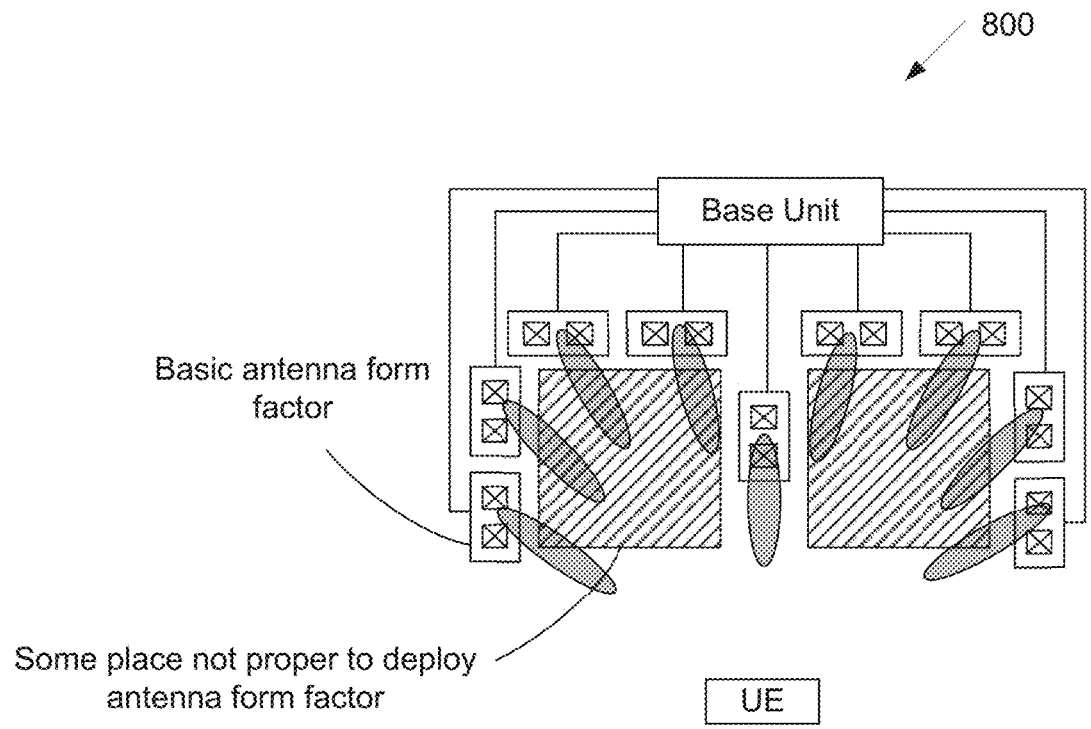
FIG. 8 illustrates an example modularized MIMO deployment according to embodiments of the present disclosure.

FIG. 8 illustrates an example modularized MIMO deployment 800 according to embodiments of the present disclosure. An embodiment of the modularized MIMO deployment 800 shown in FIG. 8 is for illustration only.

As illustrated in FIG. 8, $(N_1, N_2)=(2, 1)$ and $(N_1, N_2)=(1, 2)$ are used as a basic antenna module pair. Here, the numbers of basic antenna modules for $(N_1, N_2)=(2, 1)$ and $(N_1, N_2)=(1, 2)$ are 5 and 4, respectively. If the parameter described in example I.2.2 is used, it is given by $N_{module,V}=5$ and $N_{module,H}=4$.

In one embodiment I.3, a UE is configured with the number of collocated groups for antenna modules, parameterized by $N_{col}$.

In one example I.3.1, the number of collocated groups, $N_{col}$, is a value chosen from $\{1, 2, 3, 4\}$. In another example, $N_{col}$ is a value chosen from $\{2, 4, 6, 8\}$.

In one example, I.3.2, for each collocated group g, a possibly different value of $N_{module}$ is used to indicate the number of basic antenna modules. For example, $N_{module,g}$ can be used for the case of a single basic unit. In another example, $N_{module,V,g}$ and $N_{module,H,g}$ can be used to indicate the numbers of basic antenna modules for a first and a second basic units, respectively, for each collocated group g. In another example, $N_{module,i,g}$ can be used to indicate the number of basic antenna modules for the i-th type of basic unit for each collocated group g.

Figure 9:
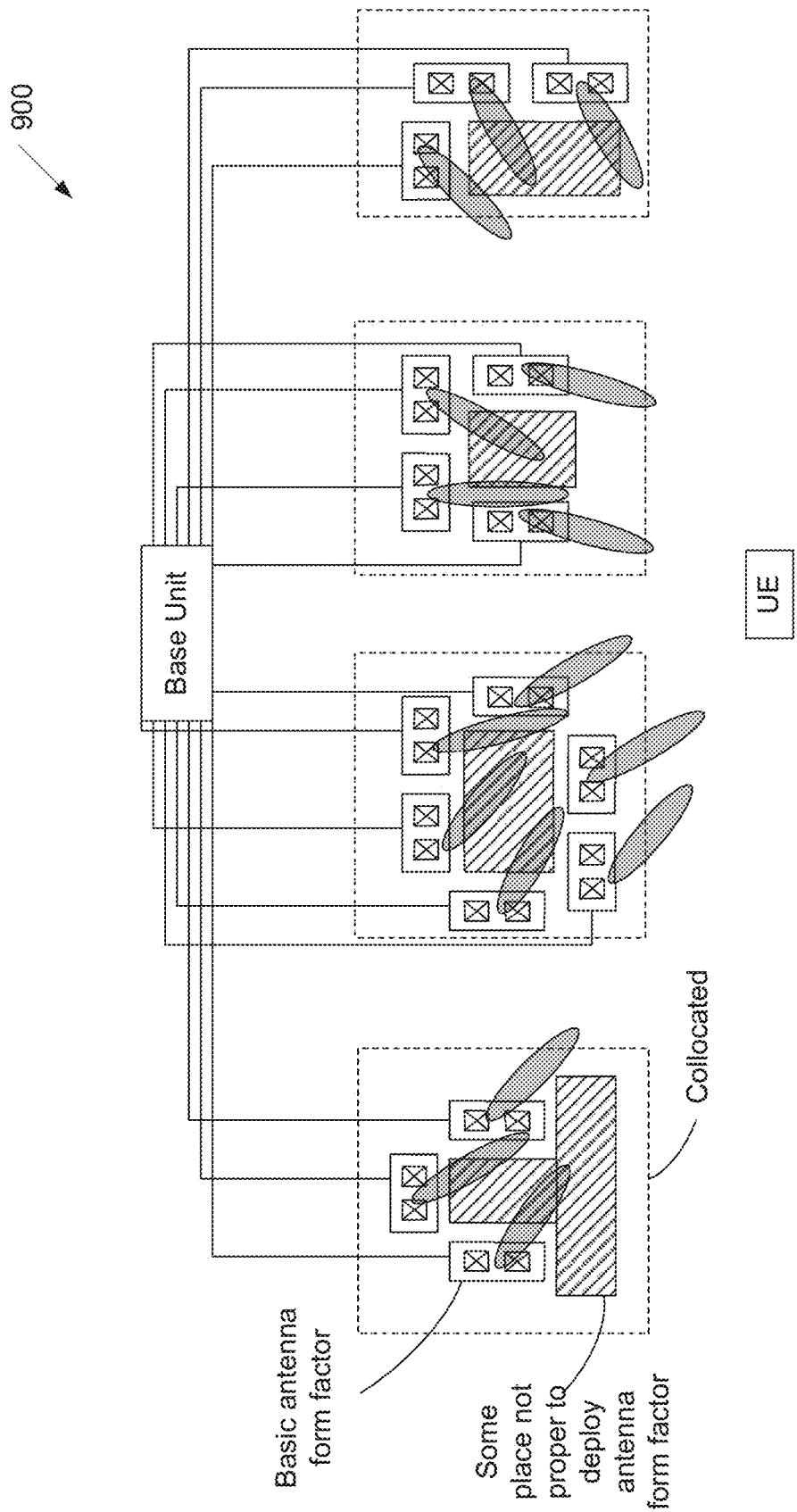
FIG. 9 illustrates an example modularized MIMO deployment with collocated grouping according to embodiments of the present disclosure.

FIG. 9 illustrates an example modularized MIMO deployment with collocated grouping 900 according to embodiments of the present disclosure. An embodiment of the modularized MIMO deployment with collocated grouping 900 shown in FIG. 9 is for illustration only.

As illustrated in FIG. 9, a UE can be configured with the parameters of $N_{col}=4$, $\{N_{module,H,g}\}_{g=1}^{N_{col}}=\{1,4,2,1\}$, and $\{N_{module,V,g}\}_{g=1}^{N_{col}}=\{2, 2, 2, 2\}$ to indicate the antenna system structure of NW to the UE. That is, arbitrary antenna system such a deployment illustrated in FIG. 9 can be abstracted with the parameters of $N_{col}$, $N_{module,H,g}$, and $N_{module,V,g}$, and these parameters can be used to construct codebook structure (it may be described in embodiment of component 2) corresponding to the abstracted antenna system.

Figure 10:
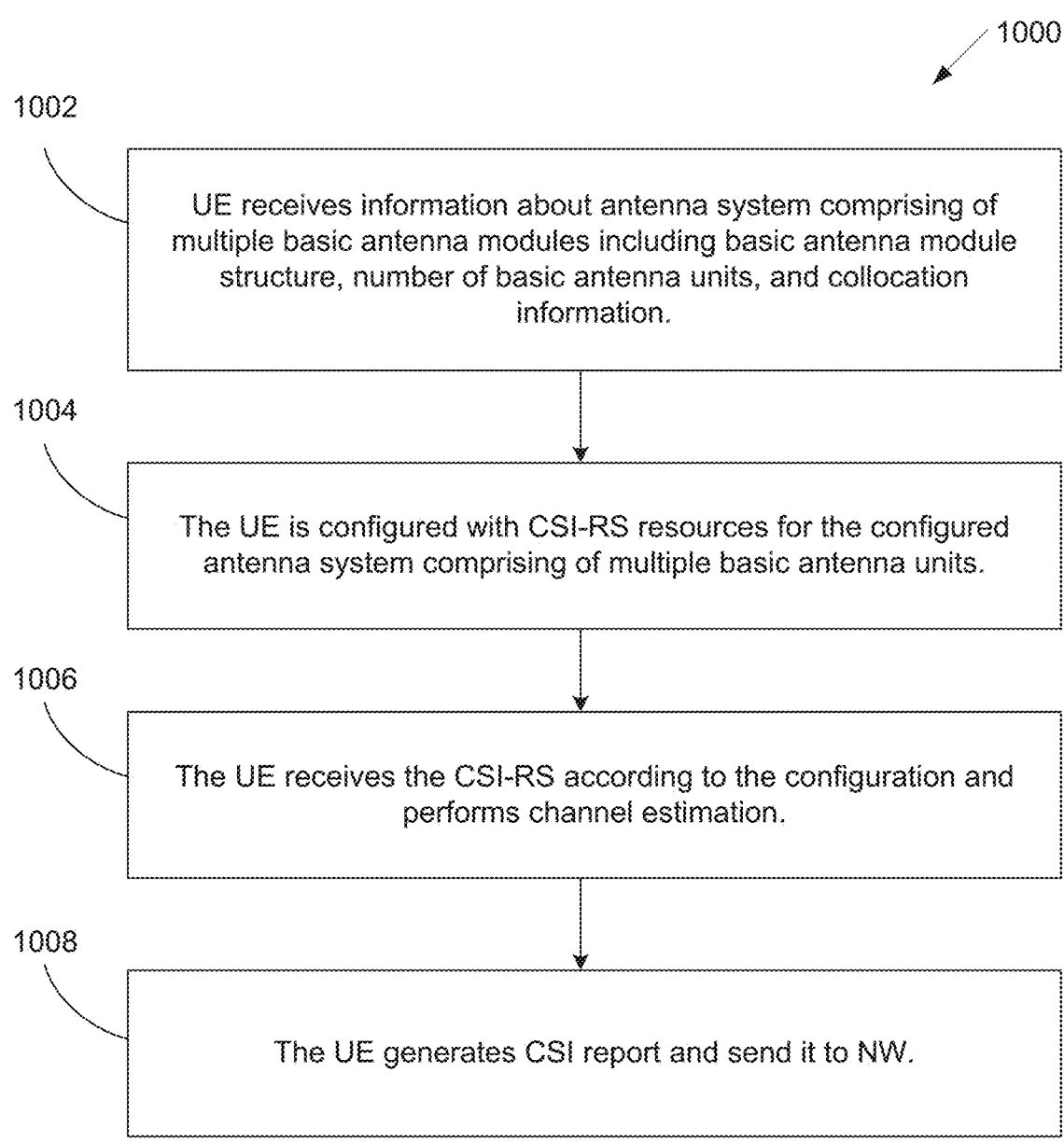
FIG. 10 illustrates a flowchart of a method of a UE for CSI generation and reporting in modularized MIMO according to embodiments of the present disclosure.

In one embodiment, a CSI generation and reporting in modularized MIMO can include four operations as illustrated in FIG. 10. As illustrated in FIG. 10, a method 1000 can be accomplished by UE, for example, shown in FIG. 8 and FIG. 9.

FIG. 10 illustrates a flowchart of a method 1000 for CSI generation and reporting in modularized MIMO according to embodiments of the present disclosure. The method 1900 may be performed by a UE (e.g., 111-116 as illustrated in FIG. 1). An embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

As illustrated in FIG. 10, at step 1002, a UE receives information about antenna system comprising of multiple basic antenna modules including basic antenna module structure, number of basic antenna units, and collocation information. In one example, the information can contain $N_{col}$, $\{N_{module,H,g}\}_{g=1}^{N_{col}}$, and $\{N_{module,V,g}\}_{g=1}^{N_{col}}$.

In step 1004, the UE is configured with CSI-RS resources for the configured antenna system comprising of multiple basic antenna units. In one example, CSI-RS ports are numbered in the following order: antenna modules for a first basic unit for collocated group 1, antenna modules for a second basic unit for collocated group 1, antenna modules for a first basic unit for collocated group 2, antenna modules for a second basic unit for collocated group 2, and so on.

In step 1006, the UE receives the CSI-RS according to the configuration and performs channel estimation.

In step 1008, the UE generates CSI report and send the CSI report to the NW. In one example, the UE selects the CSI under the codebook structure that may be explained in embodiments of components II and III.

In one embodiment of component II, a codebook structure for modularized MIMO is provided. In one embodiment II.1, a UE is configured with a modularized MIMO codebook, which includes a basis matrix $W_b$ in the codebook structure to compress channel coefficients for basic antenna modules.

In one embodiment II.2, the precoder structure of a modularized MIMO codebook (for each layer $\ell$) is given by $W^\ell_{AD-FD,i}=W_b W_c W_f^H$ for each port i of all of the basic antenna modules, where $W^\ell_{AD-FD,i}$ is the channel coefficient matrix over antenna module and subband (frequency) domains for a given port i of all of the basic antenna modules, $W_b$ is used to indicate/report an antenna-module-domain (AD) basis comprising of AD basis vectors, $W_f$ is used to indicate/report a frequency-domain (FD) basis comprising of FD basis vectors, and $W_c$ is used to indicate/report coefficients corresponding to the AD-FD basis vector pairs. Here, $W_b$, $W_c$, and $W_f$ are $N_{module}$-by-U, U-by-M, and K-by-M matrices, where $U(\leq N_{module})$ is the number of AD basis vectors, K is the number of subbands, and $M(\leq K)$ is the number of FD basis vectors.

Figure 11:
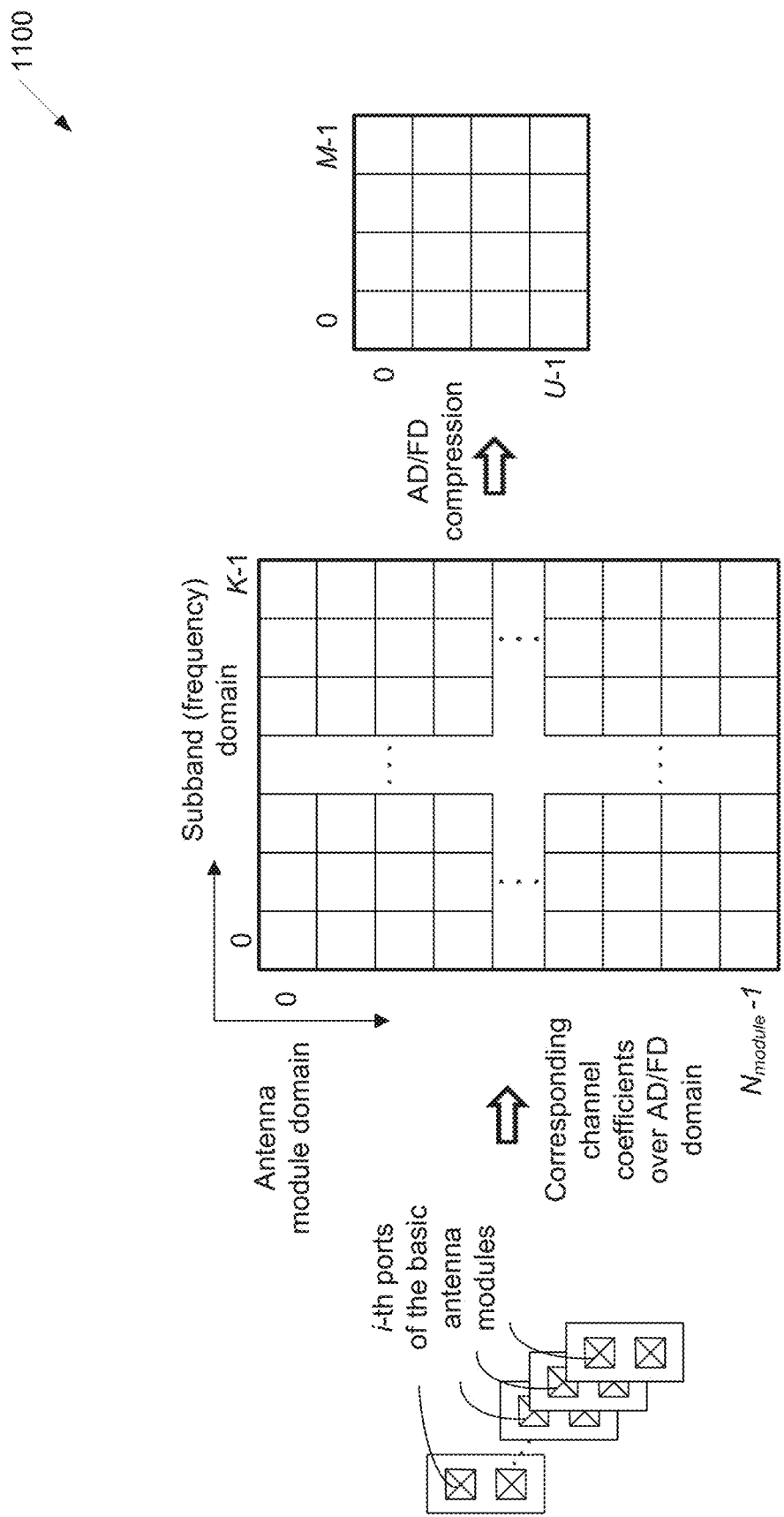
FIG. 11 illustrates an example channel coefficient compression according to embodiments of the present disclosure.

In one example II.2.1, for the case of basic antenna module of $(N_1, N_2)=(1,2)$, $W_b$, $W_c$, and $W_f$ are selected for each port i=0,1,2,3 independently (port-specifically) and reported to the NW. As illustrated in FIG. 11, the channel coefficients (i.e., the center grid) that are corresponding to the i-th ports of the basic antenna modules and subbands can be compressed by using $W_b$ and $W_f$ to reduce the dimension of the channel coefficients to be reported to the NW, i.e., in the form of $W_c$ shown in the right grid.

FIG. 11 illustrates an example channel coefficient compression 1100 according to embodiments of the present disclosure. An embodiment of the channel coefficient compression 1100 shown in FIG. 11 is for illustration only.

FIG. 11 illustrates a channel coefficient compression using AD/FD bases for $(N_1, N_2)=(1, 2)$.

In one example II.2.2, for the case of basic antenna module of $(N_1, N_2)=(1, 2)$, $W_b$, $W_c$, and $W_f$ are selected for each dual-polarized port pair i=0,1 independently (polarized-common) and reported to the NW. Optionally, a co-phase factor can be indicated to the channel coefficient difference between two polarizations.

In one example II.2.3, $W_b$, $W_c$, and $W_f$ are commonly selected for all antenna ports and reported to the NW. Optionally, a spatial domain (SD) basis comprising of SD basis vectors can be indicated to the channel coefficient difference between antenna ports within each panel.

In one example II.2.4, $W_f=I$, i.e., there is no FD basis matrix and no frequency compression. In this case, the precoder structure is given by $W^\ell_{AD-FD,i}=W_b W_c$.

In one example II.2.5, $W_b$ is commonly selected across antenna ports (i.e., AD basis is the same across antenna ports) and reported to the NW. $W_c$ and $W_f$ can be independently selected for each antenna port and reported to the NW.

In one example II.2.6, $W_f$ is commonly selected across antenna ports (i.e., FD basis is the same across antenna ports) and reported to the NW. $W_b$ and $W_c$ can be independently selected for each antenna port and reported to the NW.

In one example II.2.7, $W_b$ and $W_f$ are commonly selected across antenna ports (i.e., AD/FD bases are the same across antenna ports, respectively) and reported to the NW. $W_c$ can be independently selected for each antenna port and reported to the NW.

In one embodiment II.3, the precoder structure of a modularized MIMO codebook (for each layer $\ell$) is given by (basic-unit specifically) $W^\ell_{AD-FD,i,V}=W_{b,V} W_{c,V} W_{f,V}^H$ and $W^\ell_{AD-FD,i,H}=W_{b,H} W_{c,H} W_{f,H}^H$ for each port i of all of the basic antenna modules, where $W^\ell_{AD-FD,i,V}$ and $W^\ell_{AD-FD,i,H}$ are the channel coefficient matrices over antenna module and subband (frequency) domains for a given port i of all of the basic antenna modules for a first and a second basic units, respectively, $W_{b,V}$ and $W_{b,H}$ are used to indicate/report antenna-module-domain (AD) bases comprising of AD basis vectors for a first and a second basic units, respectively, $W_{f,V}$ and $W_{f,H}$ are used to indicate/report frequency-domain (FD) bases comprising of FD basis vectors for a first and a second basic units, respectively, and $W_{c,V}$ and $W_{c,H}$ are used to indicate/report coefficient matrices corresponding to the AD-FD basis vector pairs for a first and second basic units, respectively.

In such embodiment, $W_{b,V}$, $W_{c,V}$, and $W_{f,V}$ are $N_{module,V}$-by-U, U-by-M, and K-by-M matrices, where $U(\leq N_{module,V})$ is the number of AD basis vectors, K is the number of subbands, and $M(\leq K)$ is the number of FD basis vectors, and $W_{b,H}$, $W_{c,H}$, and $W_{f,H}$ are $N_{module,H}$-by-U, U-by-M, and K-by-M matrices, where $U(\leq N_{module,V})$ is the number of AD basis vectors, K is the number of subbands, and $M(\leq K)$ is the number of FD basis vectors. Although it may provide that the case has two types of basic antenna modules for illustration purpose, the precoder structure can be directly extended to the case where more than two types of basic antenna modules exist, by simply adding a subscript parameter for indicating basic module type.

In one example II.3.1, for the case of basic antenna modules of $(N_1, N_2)=(1, 2)$ and $(2, 1)$, $W_{b,V}$, $W_{c,V}$, and $W_{f,V}$ are selected for each port i=0, 1, 2, 3 independently (port-specifically) and reported to the NW, and $W_{b,H}$, $W_{c,H}$, and $W_{f,H}$ are selected for each port i=0, 1, 2, 3 independently (port-specifically) and reported to the NW.

In one example II.3.2, for the case of basic antenna modules of $(N_1, N_2)=(1, 2)$ and $(2, 1)$, $W_{b,V}$, $W_{c,V}$, and $W_{f,V}$ are selected for each dual-polarized port pair i=0,1 independently (polarized-common) and reported to the NW. Optionally, a co-phase factor can be indicated to the channel coefficient difference between two polarizations for the first basic units. $W_{b,H}$, $W_{c,H}$, and and $W_{f,H}$ are selected for each dual-polarized port pair i=0,1 independently (polarized-common) and reported to the NW. Optionally, a co-phase factor can be indicated to the channel coefficient difference between two polarizations for the second basic units.

In one example II.3.3, $W_{b,V}$, $W_{c,V}$, and $W_{f,V}$ are commonly selected for all antenna ports for the first basic units and reported to the NW. Optionally, a spatial domain (SD) basis comprising of SD basis vectors can be indicated to the channel coefficient difference between antenna ports within each panel for the first basic units. $W_{b,H}$, $W_{c,H}$, and $W_{f,H}$ are commonly selected for all antenna ports for the second basic units and reported to the NW. Optionally, a spatial domain (SD) basis comprising of SD basis vectors can be indicated to the channel coefficient difference between antenna ports within each panel for the second basic units.

In one example II.3.4, $W_f=I$, i.e., there is no FD basis matrix and no frequency compression. In this case, the precoder structure is given by $W^{\ell}_{AD-FD,i,V} = W_{b,V} W_{c,V}$ and $W^{\ell}_{AD-FD,i,H} = W_{b,H} W_{c,H}$.

In one example II.3.5, $W_{b,V}$ and $W_{b,H}$ are commonly selected across antenna ports (i.e., AD bases are the same across antenna ports), respectively, and reported to the NW. $W_{c,V}$, $W_{c,H}$, $W_{f,V}$, and $W_{f,H}$ can be independently selected for each antenna port and reported to the NW.

In one example II.3.6, $W_{f,V}$ and $W_{f,H}$ are commonly selected across antenna ports (i.e., FD bases are the same across antenna ports), respectively, and reported to the NW. $W_{b,V}$, $W_{b,H}$, $W_{c,V}$, and $W_{c,H}$ can be independently selected for each antenna port and reported to the NW.

In one example II.3.7, $W_{b,V}$, $W_{b,H}$, $W_{f,V}$, and $W_{f,H}$ are commonly selected across antenna ports (i.e., AD/FD bases are the same across antenna ports, respectively), respectively, and reported to the NW. $W_{c,V}$ and $W_{c,H}$ can be independently selected for each antenna port and reported to the NW.

In embodiment II.4, the precoder structure of a modularized MIMO codebook (for each layer $\ell$) is given by (basic-unit specifically) $W^{\ell}_{AD-FD,i,V,g} = W_{b,V,g} W_{c,V,g} W_{f,V,g}^H$ and $W^{\ell}_{AD-FD,i,V,g} = W_{b,H,g} W_{c,H,g} W_{f,H,g}^H$ for each port i of all of the basic antenna modules for a given group g, where $W^{\ell}_{AD-FD,i,V,g}$ and $W^{\ell}_{AD-FD,i,V,g}$ are the channel coefficient matrices over antenna module and subband (frequency) domains for a given group g for a given port i of all of the basic antenna modules for a first and a second basic units, respectively, $W_{b,V,g}$ and $W_{b,H,g}$ are used to indicate/report antenna-module-domain (AD) bases comprising of AD basis vectors for a given group g for a first and a second basic units, respectively, $W_{f,V,g}$ and $W_{f,H,g}$ are used to indicate/report frequency-domain (FD) bases comprising of FD basis vectors for a given group g for a first and a second basic units, respectively, and $W_{c,V,g}$ and $W_{c,H,g}$ are used to indicate/report coefficient matrices corresponding to the AD-FD basis vector pairs for a given group g for a first and second basic units, respectively.

In such embodiment, $W_{b,V,g}$, $W_{c,V,g}$, and $W_{f,V,g}$ are $N_{module,V,g}$-by-U, U-by-M, and K-by-M matrices, where $U(\leq N_{module,V})$ is the number of AD basis vectors, K is the number of subbands, and $M(\leq K)$ is the number of FD basis vectors, and $W_{b,H,g}$, $W_{c,H,g}$ and $W_{f,H,g}$ are $N_{module,H,g}$-by-U, U-by-M, and K-by-M matrices, where $U(\leq N_{module,V})$ is the number of AD basis vectors, K is the number of subbands, and $M(\leq K)$ is the number of FD basis vectors. Although it may provide here the case having two types of basic antenna modules for illustration purpose, the precoder structure can be directly extended to the case where more than two types of basic antenna modules exist, by simply adding a subscript parameter for indicating basic module type.

In one example II.4.1, for the case of basic antenna modules of $(N_1, N_2)=(1, 2)$ and $(2, 1)$, $W_{b,V,g}$, $W_{c,V,g}$ and $W_{f,V,g}$ are selected for a group g for each port i=0,1,2,3 independently (port-specifically) and reported to the NW, and $W_{b,H,g}$, $W_{c,H,g}$ and $W_{f,H,g}$ are selected for a group g for each port i=0, 1, 2, 3 independently (port-specifically) and reported to the NW.

In one example II.4.2, for the case of basic antenna modules of $(N_1, N_2)=(1, 2)$ and $(2, 1)$, $W_{b,V,g}$, $W_{c,V,g}$, and $W_{f,V,g}$ are selected for a group g for each dual-polarized port pair i=0,1 independently (polarized-common) and reported to the NW. Optionally, a co-phase factor can be indicated to the channel coefficient difference between two polarizations for the first basic units. $W_{b,H,g}$, $W_{c,H,g}$, and $W_{f,H,g}$ are selected for a group g for each dual-polarized port pair i=0, 1 independently (polarized-common) and reported to the NW. Optionally, a co-phase factor can be indicated to the channel coefficient difference between two polarizations for the second basic units.

In one example II.4.3, $W_{b,V,g}$, $W_{c,V,g}$, and $W_{f,V,g}$ are commonly selected for a group g for all antenna ports for the first basic units and reported to the NW. Optionally, a spatial domain (SD) basis comprising of SD basis vectors can be indicated to the channel coefficient difference between antenna ports within each panel for the first basic units. $W_{b,H,g}$, $W_{c,H,g}$, and $W_{f,H,g}$ are commonly selected for a group g for all antenna ports for the second basic units and reported to the NW. Optionally, a spatial domain (SD) basis comprising of SD basis vectors can be indicated to the channel coefficient difference between antenna ports within each panel for the second basic units.

In one example II.4.4, $W_f=I$, i.e., there is no FD basis matrix and no frequency compression. In this case, the precoder structure is given by $W^{\ell}_{AD-FD,i,V} = W_{b,V,g} W_{c,V,g}$ and $W^{\ell}_{AD-FD,i,V,g} = W_{b,H,g} W_{c,H,g}$.

In one example II.4.5, $W_{b,V,g}$ and $W_{b,H,g}$ are commonly selected for group g across antenna ports (i.e., AD bases are the same across antenna ports), respectively, and reported to the NW. $W_{c,V,g}$, $W_{c,H,g}$, $W_{f,V,g}$ and $W_{f,H,g}$ can be independently selected for group g for each antenna port and reported to the NW.

In one example II.4.6, $W_{f,V,g}$ and $W_{f,H,g}$ are commonly selected for group g across antenna ports (i.e., FD bases are the same across antenna ports), respectively, and reported to the NW. $W_{b,V,g}$, $W_{b,H,g}$, $W_{c,V,g}$, and $W_{c,H,g}$ can be independently selected for group g for each antenna port and reported to the NW.

In one example II.4.7, $W_{b,V,g}$, $W_{b,H,g}$, $W_{f,V,g}$, and $W_{f,H,g}$ are commonly selected for group g across antenna ports (i.e., AD/FD bases are the same across antenna ports, respectively), respectively, and reported to the NW. $W_{c,V,g}$, and $W_{c,H,g}$ can be independently selected for group g for each antenna port and reported to the NW.

In one embodiment II.5, the AD basis matrix $W_b$ is selected from a set of oversampled DFT vectors. In one example, for a given N module and oversampled factor $O_4$, a DFT vector $p_i$ can be expressed as:

$$p_i = \left[ 1 \quad e^{j\frac{2\pi i}{O_4 N_{module}}} \quad \ldots \quad e^{j\frac{2\pi i(N_{module}-1)}{O_4 N_{module}}} \right]^T,$$

where $i \in \{0, 1, \ldots, O_4 N_{module}-1\}$. In another example, a DFT vector $p_i$ can be expressed as the above equation with replacing $N_{module}$ by $N_{module,j,g}$ for the j-th type of basic antenna module for group g.

In one embodiment II.6, the AD basis matrix $W_b$ is selected as a linear combination of indicator columns. In one example, the AD basis matrix $W_b$ can be a permutation matrix where each column is an indicator column. Generally, the AD basis matrix $W_b$ can be a matrix from any basis set.

In one embodiment II.7, a UE reports common and individual information on AD basis matrix tuple of $\{W_b\}_i$ across antenna ports to NW, where i is an antenna port index.

In one example II.7.1, common information on AD basis matrix tuple of $\{W_b\}_i$ across antenna ports is commonly (intersection) selected AD basis indices, and individual information on AD basis matrix tuple of $\{W_b\}_i$ across antenna ports is individually selected AD basis indices for each basis matrix that are not intersected with those of the other AD basis matrices.

In one example II.7.1.1, common and individual information on AD basis matrix tuple of $\{W_b\}_i$ across antenna ports can be indicated/reported by a parameter $\mathcal{L}$. In one example, a parameter $\mathcal{L}$ for indicating common and individual information has a bit-map indicator to indicate $2^{N_{port}}-1$ subsets of the antenna ports, where $N_{port}$ is the number of antenna ports for a basic antenna module.

For example, when $N_{port}=4$, the most significant bit (MSB) maps to indicating whether there is common information across the four antenna ports or not, the next four MSBs map to indicating whether there is common information across the three of them or not, the next six MSBs map to indicating whether there is common information across the two of them or not, and the remaining four MSB bits map to indicating there is individual information for each port, or not. In one example, "1" refers to "there is something to report" and "0" refers to "there is nothing to report" for the information corresponding to each bit.

As an example, for the case of reporting for the selected basis indices {1, 3, 4, 7}, {3, 5, 6, 7}, {2, 3, 4, 8}, and {2, 3, 5, 7} for antenna ports 1, 2, 3, and 4, respectively, when $N_{port}=4$ and $U=4$, an indication/reporting with $\mathcal{L}$ can be done as shown in TABLE 1.

TABLE 1

An example of indicating selected basis indices for $\{W_b\}_i$

| Corresp. Port # | 1, 2, 3, 4 | 1, 2, 3 | 1, 2, 4 | 1, 3, 4 | 2, 3, 4 | 1, 2 | 1, 3 | 1, 4 | 2, 3 | 2, 4 | 3, 4 | 1 | 2 | 3 | 4 |
|---|---|---|---|---|---|---|---|---|---|---|---|---|---|---|---|
| $\mathcal{L}$ | 1 | 0 | 1 | 0 | 0 | 0 | 1 | 0 | 0 | 1 | 1 | 1 | 1 | 1 | 0 |
| Selected basis indices | 3 | N/A | 7 | N/A | N/A | N/A | 4 | N/A | N/A | 5 | 2 | 1 | 6 | 8 | N/A |

$W_{c,H,g}$ can be independently selected for group g for each antenna port and reported to the NW.

In another example II.7.1.2, a parameter $\mathcal{L}$ for indicating common and individual information has an indicator to indicate which subsets are containing information to report among $2^{N_{port}}-1$ subsets of the antenna ports. In one example, depending on the number of subsets A including information, an indicator with cardinality size of $$\binom{2^{N_{port}}-1}{A}$$

(i.e., $2^{N_{port}}-1$ choose A) can be reported. Optionally, A can be also reported.

As an example, for the case of the scenario considered in TABLE 1, an indication/reporting with $\mathcal{L}$ can be done as shown in TABLE 2. Here, for illustration purpose, the same mapping order (from each element of $\mathcal{L}$ to each subset of the antenna ports) may be used as the example shown in TABLE 1. The mapping order can follow a different rule.

TABLE 2

An example of indicating selected basis indices for $\{W_b\}_i$

| Corresp. Port # | 1, 2, 3, 4 | 1, 2, 4 | 1, 3 | 2, 4 | 3, 4 | 1 | 2 | 3 |
|---|---|---|---|---|---|---|---|---|
| $\mathcal{L}$ | 1 | 3 | 7 | 10 | 11 | 12 | 13 | 14 |
| Selected basis indices | 3 | 7 | 4 | 5 | 2 | 1 | 6 | 8 |

In one embodiment, the embodiment II.7 can be extended to the case where multiple collocated groups and multiple types of basic antenna modules exist, by indicating $\{W_{b,j,g}\}_i$ separately for collocated group g for basic antenna module type j.

In one embodiment II.8, a UE reports common and individual information on FD basis matrix tuple of $\{W_{f,j,g}\}_i$ across antenna ports, basic antenna module types, and/or collocated groups to NW. Note that compared to AD basis matrix tuples that can have different basis dimensions (i.e., which is $N_{module,j,g}$) across basic antenna module types and collocated groups, FD basis matrix tuples have the same dimension K (i.e., the number of subbands) across antenna ports, basic antenna module types, and collocated groups.

In one example II.8.1, common information on AD basis matrix tuple of $\{W_{f,j,g}\}_i$ antenna ports, basic antenna module types, and/or collocated groups is the commonly (intersection) selected FD basis indices, and individual information on AD basis matrix tuple of $\{W_{f,j,g}\}_i$ antenna ports, basic antenna module types, and/or collocated groups is individually selected FD basis indices for each basis matrix that are not intersected with those of the others FD basis matrices.

In one example II.8.1.1, common and individual information on FD basis matrix tuple of $\{W_{f,j,g}\}_i$ antenna ports, basic antenna module types, and/or collocated groups can be indicated/reported by a parameter $\mathcal{L}_f$, and the approach described in example II.7.1.1 can be applicable to $\mathcal{L}_f$.

In one example II.8.1.2, common and individual information on FD basis matrix tuple of $\{W_{f,j,g}\}_i$ antenna ports, basic antenna module types, and/or collocated groups can be indicated/reported by a parameter $\tilde{\mathcal{L}}_f$, and the approach described in example II.7.1.2 can be applicable to $\tilde{\mathcal{L}}_f$.

In one embodiment II.9, each element of $W_c$ is decomposed into amplitude and phase values, and the amplitude and phase values are selected from different quantized codebooks. In one example, the amplitude and phase values can be designed similar to the codebooks for $\tilde{W}_2$ in 3GPP standard specification Rel-16 codebook.

In one example II.9.1, a bitmap is used to indicate the location (or indices) of the non-zero coefficients of the $W_c$ matrix.

In example II.9.2, a strongest coefficient indicator (SCI) is used to indicate the location (or index) of the strongest coefficient of the $W_c$ matrix.

In one example II.9.3, amplitude and phase of the non-zero coefficients of the $W_c$ matrix are reported using respective codebooks. In one example, the phase codebook is fixed, e.g., 16 PSK. In one example, the phase codebook is configured, e.g., from 8 PSK (3-bit per phase) and 16 PSK (4-bit per phase).

In one embodiment II.10, for a coefficient matrix tuple of $\{W_c\}_i$ across antenna ports, a matrix stacking $\{W_c\}_i$ is decomposed into two matrices $W_{c,1}$ and $W_{c,2}$ which can be expressed as:

$$\begin{bmatrix} W_c^1 \\ W_c^2 \\ \vdots \\ W_c^{N_{port}} \end{bmatrix} \cong W_{c,1} W_{c,2},$$

where $W_c^i$ is the coefficient matrix $W_c$ for antenna port i, $W_{c,1}$ is a $Q \times R (\leq Q)$ basis matrix, and $W_{c,2}$ is a $R \times M$ coefficient matrix. In one example, $Q = UN_{port}$ for the case having the same number of AD basis vectors across antenna ports. In another example, $Q = \Sigma_i U_i$ for the case having the different number of AD basis vectors across antenna ports. $W_{c,1}$ and $W_{c,2}$ are reported to the NW to construct $\{W_c\}_i$.

In one embodiment II.10.1, a basis matrix $W_{c,1}$ is selected from a set of oversampled DFT vectors. In one example, for a given Q and oversampled factor $O_5$, a DFT vector $c_i$ can be expressed as:

$$c_i = \begin{bmatrix} 1 & e^{j\frac{2\pi i}{O_5 Q}} & \ldots & e^{j\frac{2\pi i (Q-1)}{O_5 Q}} \end{bmatrix}^T,$$

where $i \in \{0, 1, \ldots, QO_5 - 1\}$.

In one embodiment II.10.2, each element of $W_{c,2}$ is decomposed into amplitude and phase values, and the amplitude and phase values are selected from different quantized codebooks. In one example, the amplitude and phase values can be designed similar to the codebooks for $\tilde{W}_2$ in 3GPP standard specification Rel-16 codebook.

In one example II.10.2.1, a bitmap is used to indicate the location (or indices) of the non-zero coefficients of the $W_{c,2}$ matrix.

In one example II.10.2.2, a strongest coefficient indicator (SCI) is used to indicate the location (or index) of the strongest coefficient of the $W_{c,2}$ matrix.

In one example II.10.2.3, amplitude and phase of the non-zero coefficients of the $W_{c,2}$ matrix are reported using respective codebooks. In one example, the phase codebook is fixed, e.g., 16 PSK. In one example, the phase codebook is configured, e.g., from 8 PSK (3-bit per phase) and 16 PSK (4-bit per phase).

In one embodiment II.11, for a coefficient matrix tuple of $\{W_{c,j,g}\}_i$ across antenna ports, basic antenna module types, and/or collocated groups, a matrix stacking $\{W_{c,j,g}\}_i$ is decomposed into two matrices $W_{c,1}$ and $W_{c,2}$ which can follow the same approach shown in embodiment II.10, and its sub-embodiments/examples.

In one embodiment of component 3, inter-(collocated-) group coefficients are provided.

In one embodiment III.1, the codebook includes additional components for $N_{col}$ collocated groups.

In one example III.1.1, the additional components include inter-collocated-group phase. In one example, the inter-collocated-group phase values correspond to $N_{col} - 1$ phase values (e.g., assuming one of the collocated groups is a reference and has a fixed phase value=1).

In another example, the inter-collocated-group phase values correspond to $N_{col}$ phase values. The inter-collocated-group phase values can be quantized/reported as scalars using a scalar codebook (e.g., QPSK, 2 bits per phase or 8 PSK, 3 bits per phase) or as a vector using a vector codebook (e.g., a DFT codebook). Also, for a dual-polarized antenna module at a collocated group, the inter-collocated-group phase can be the same for two polarizations of the collocated-group. Or the inter-collocated-group phase can be independent for two polarizations for the collocated-group.

At least one of the following example is used for the inter-collocated-group phase reporting.

In one example III.1.1.1, the inter-collocated-group phase is reported in a wideband (WB) manner, i.e., one value is reported for all SBs in the configured CSI reporting band.

In one example III.1.1.2, the inter-collocated-group phase is reported in a subband (SB) manner, i.e., one value is reported for each SB in the configured CSI reporting band.

In one example III.1.1.3, the inter-collocated-group phase is reported in a WB plus SB manner, i.e., one WB phase value is reported for all SBs in the configured CSI reporting band, and one SB value is reported for each SB in the configured CSI reporting band.

In one example III.1.2, the additional components include inter-collocated-group phase and inter-collocated-group amplitude, wherein the details about the inter-collocated-group phase are as explained in example III.1.1.

Note that inter-collocated-group amplitude is needed due to unequal distance of the UE from the collocated-groups. In one example, the inter-collocated-group amplitude values correspond to $N_{col}-1$ amplitude values (e.g., assuming one of the collocated-groups is a reference and has a fixed amplitude value=1). In another example, the inter-collocated-group amplitude values correspond to $N_{col}$ amplitude values. The inter-collocated-group amplitude values can be quantized/reported as scalars using a scalar codebook (e.g., 2 bits per amplitude or 3 bits per amplitude) or as a vector using a vector codebook. Also, for a dual-polarized antenna at a collocated group, the inter-collocated-group amplitude can be the same for two polarizations of the collocated-group. Or the inter-collocated-group amplitude can be independent for two polarizations for the collocated-group.

At least one of the following example is used for the inter-collocated-group amplitude and phase reporting.

In one example III.1.2.1, the inter-collocated-group amplitude is reported in a wideband (WB) manner, i.e., one value is reported for all SBs in the configured CSI reporting band. At least one of the following example is used for the inter-collocated-group phase.

In one example III.1.2.1.1, the inter-collocated-group phase is reported is reported according to example III.1.1.1.

In one example III.1.2.1.2, the inter-collocated-group phase is reported is reported according to example III.1.1.2.

In one example III.1.2.1.3, the inter-collocated-group phase is reported is reported according to example III.1.1.3.

In one example III.1.2.2, the inter-collocated-group amplitude is reported in a subband (SB) manner, i.e., one value is reported for each SB in the configured CSI reporting band. At least one of the following example is used for the inter-collocated-group phase.

In one example III.1.2.2.1, the inter-collocated-group phase is reported is reported according to example III.1.1.1.

In one example III.1.2.2.2, the inter-collocated-group phase is reported is reported according to example III.1.1.2.

In one example III.1.2.2.3, the inter-collocated-group phase is reported is reported according to example III.1.1.3.

In one example III.1.2.3, the inter-collocated-group amplitude is reported in a WB plus SB manner, i.e., one WB amplitude value is reported for all SBs in the configured CSI reporting band, and one SB value is reported for each SB in the configured CSI reporting band. At least one of the following example is used for the inter-collocated-group phase.

In one example III.1.2.3.1, the inter-collocated-group phase is reported is reported according to example III.1.1.1.

In one example III.1.2.3.2, the inter-collocated-group phase is reported is reported according to example III.1.1.2.

In one example III.1.2.3.3, the inter-collocated-group phase is reported is reported according to example III.1.1.3.

In one example III.1.3, the additional components include inter-collocated-group amplitude, wherein the details about the inter-collocated-group amplitude are as explained in example III.1.2.

In one example III.1.4, the additional components include inter-collocated-group power, wherein the details about the inter-collocated-group power are as explained in example III.1.2 by replacing amplitude with power. In one example, a square of inter-collocated-group amplitude equals inter-collocated-group power.

In one example III.1.5, the additional components include inter-collocated-group phase and inter-collocated-group power, wherein the details about the inter-collocated-group phase are as explained in example III.1.1, and the details about the inter-collocated-group power are as explained in example III.1.2 by replacing amplitude with power. In one example, a square of inter-collocated-group amplitude equals inter-collocated-group power.

In one example III.1.6, the additional components include an indicator indicating the strongest collocated-group (for reference). Due to distributed architecture, the strongest collocated-group can be reported in order to indicate the reference collocated-group with respect to which the inter-collocated-group components (such as amplitude or/and phase) are reported. The inter-collocated-group amplitude and phase associated with the strongest collocated-group can be set to a fixed value, for example 1. At least one of the following example is used for the strongest collocated-group reporting.

In one example III.1.6.1, the strongest collocated-group (indicator) is reported in a WB manner, i.e., one value (indicator) is reported for all SBs.

In one example III.1.6.2, the strongest collocated-group (indicator) is reported in a SB manner, i.e., one value (indicator) is reported for each SB.

Any of the above variation embodiments can be utilized independently or in combination with at least one other variation embodiment.

Figure 12:
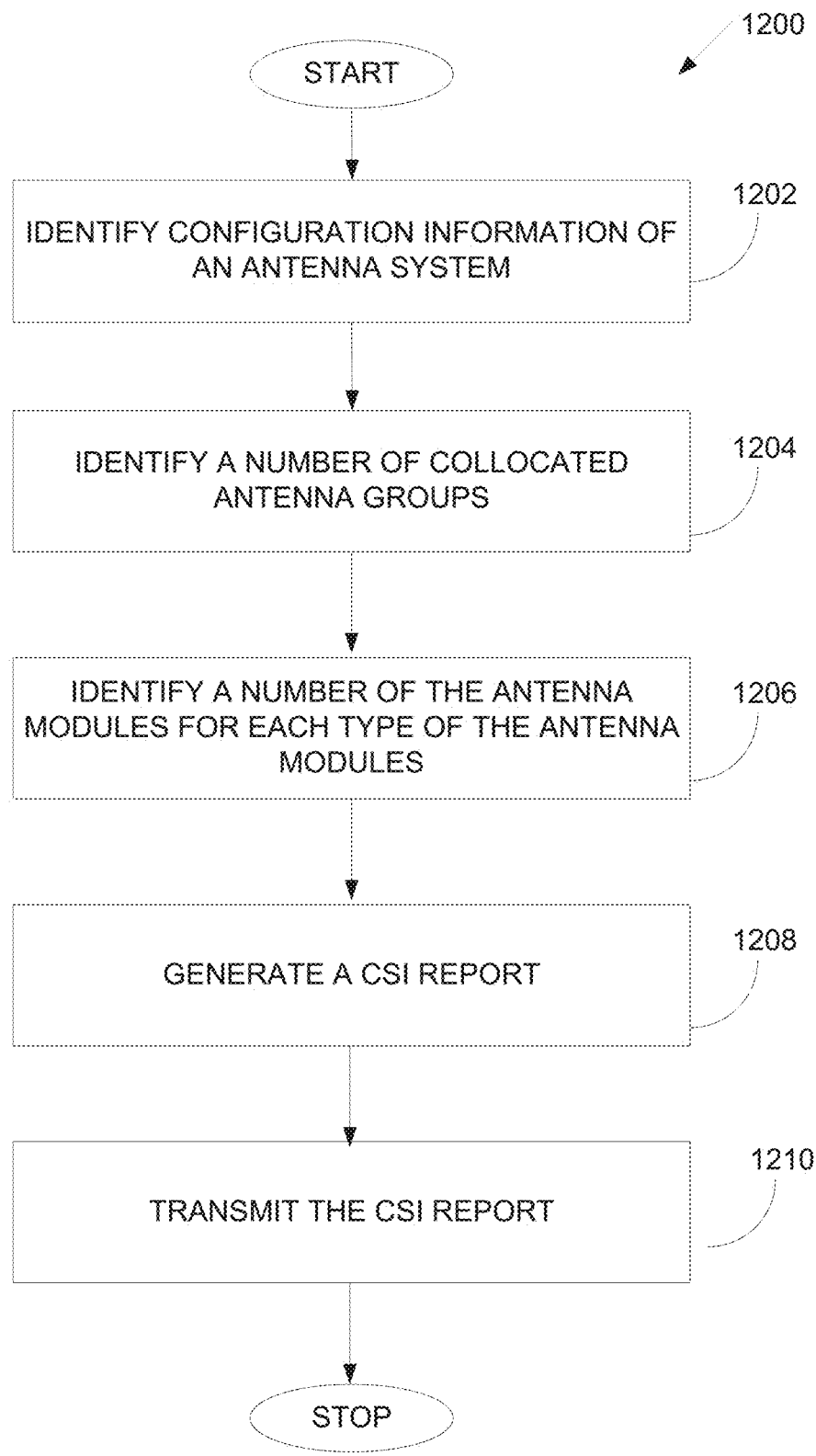
FIG. 12 illustrates a flowchart of a method for modular MIMO and CSI feedback according to embodiments of the present disclosure.

FIG. 12 illustrates a flowchart of a method 1200 of a UE for modular MIMO and CSI feedback according to embodiments of the present disclosure. The method 1200 may be performed by a UE (e.g., 111-116 as illustrated in FIG. 1). An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

AS illustrated in FIG. 12, the method 1200 begins at step 1202. In step 1202, the UE identifies configuration information of an antenna system including antenna modules for a MIMO operation.

Subsequently, in step 1204, the UE identifies, based on the configuration information, a number of collocated antenna groups that each includes one or more of the antenna modules.

Subsequently, in step 1206, the UE identifies, based on the configuration information, a number of the antenna modules for each type of the antenna modules in each of the collocated antenna groups, wherein each of the collocated antenna groups includes one or more types of the antenna modules.

In step 1206, a collocated antenna group includes at least two types of antenna modules comprising a first module with a first type of antenna module and a second module with a second type of antenna module.

Next, in step 1208, the UE generates a CSI report for one or more of the collocated antenna groups in the antenna system.

Finally, in step 1210, the UE transmits, to a BS, the CSI report.

In one embodiment, the UE identifies, for each of the collocated antenna groups, based on an antenna module domain and a subband domain for respective antenna port of the antenna modules, a channel coefficient matrix for multiple antenna modules. In such embodiment, the channel coefficient matrix comprises a first matrix indicating an AD basis that includes AD basis vectors, a second matrix indicating a FD basis that includes FD basis vectors, and a third matrix indicating coefficients corresponding to pairs of the AD and FD basis vectors.

In one embodiment, the UE selects the first matrix from a set of oversampled DFT vectors, and reports, to a base station, common information and individual information on an AD basis matrix tuple, associated with the first matrix, across antenna ports of the antenna modules. In such embodiment, the common information is a same for multiple antenna ports of the antenna modules and the individual information is different for each antenna port of the antenna modules.

In one embodiment, the UE selects the second matrix from a set of oversampled DFT vectors, and reports, to the base station, common information and individual information on an FD basis matrix tuple, associated with the second matrix, across antenna ports of the antenna modules for the collocated antenna groups. In such embodiment, the common information is a same for multiple antenna ports of the antenna modules for the collocated antenna groups and the individual information is different for each antenna port of the antenna modules for the collocated antenna groups.

In one embodiment, the UE identifies a coefficient matrix tuple across antenna ports of the antenna modules to identify a concatenated matrix of the coefficient matrix tuple. In such embodiment, the concatenated matrix is represented as a sum of coefficient basis vectors and corresponding coefficients and the CSI report includes the coefficient basis vectors and the corresponding coefficients.

In one embodiment, the UE identifies, for each of the collocated antenna groups, based on an antenna module domain and a subband domain for respective antenna port of each type of the antenna modules, a channel coefficient matrix for multiple antenna modules. In such embodiment, the channel coefficient matrix comprises a matrix indicating an AD basis that includes AD basis vectors for each type of the antenna modules, a matrix indicating an FD basis that includes FD basis vectors for each type of the antenna modules, and a matrix indicating coefficients corresponding to pairs of the AD and FD basis vectors for each type of the antenna modules.

In one embodiment, the UE identifies an inter-collocated group coefficient component comprising an inter-collocated group phase component and an inter-collocated group amplitude component. In such embodiment, the inter-collocated group phase component is determined as a value based on the number of collocated antenna groups and a reference value that is set to one. In such embodiment, the inter-collocated group amplitude component is determined as a value based on the number of collocated antenna groups and the reference value that is set to one.

In one embodiment, the UE transmits, to the base station, the inter-collocated group phase and amplitude components for at least one of a WB component or a SB component. In such embodiment, the WB component comprises a value that is reported for all SBs in a frequency band configured for the CSI report and the SB component comprises a value that is reported for each SB in the frequency band configured for the CSI report.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system, the UE comprising:
   a processor configured to:
      identify configuration information of an antenna system including antenna modules for a multi-input multi-output (MIMO) operation,
      identify, based on the configuration information, a number of collocated antenna groups that each includes one or more of the antenna modules,
      identify, based on the configuration information, a number of the antenna modules for each type of the antenna modules in each of the collocated antenna groups, wherein each of the collocated antenna groups includes one or more types of the antenna modules, and
      generate a channel state information (CSI) report for one or more of the collocated antenna groups in the antenna system; and
   a transceiver operably coupled to the processor, the transceiver configured to transmit, to a base station (BS), the CSI report.

2. The UE of claim 1, wherein a collocated antenna group includes at least two types of antenna modules comprising a first module with a first type of antenna module and a second module with a second type of antenna module.

3. The UE of claim 1, wherein the processor is further configured to identify, for each of the collocated antenna groups, based on an antenna module domain and a subband domain for respective antenna port of the antenna modules, a channel coefficient matrix for multiple antenna modules, the channel coefficient matrix comprising:
   a first matrix indicating an antenna domain (AD) basis that includes AD basis vectors;
   a second matrix indicating a frequency domain (FD) basis that includes FD basis vectors; and
   a third matrix indicating coefficients corresponding to pairs of the AD and FD basis vectors.

4. The UE of claim 3, wherein:
   the processor is further configured to select the first matrix from a set of oversampled discrete Fourier transform (DFT) vectors;
   the transceiver is configured to report, to a base station, common information and individual information on an AD basis matrix tuple, associated with the first matrix, across antenna ports of the antenna modules;
   the common information is a same for multiple antenna ports of the antenna modules; and
   the individual information is different for each antenna port of the antenna modules.

5. The UE of claim 3, wherein:
   the processor is further configured to select the second matrix from a set of oversampled discrete Fourier transform (DFT) vectors;
   the transceiver is configured to report, to the base station, common information and individual information on an FD basis matrix tuple, associated with the second matrix, across antenna ports of the antenna modules for the collocated antenna groups;

the common information is a same for multiple antenna ports of the antenna modules for the collocated antenna groups; and the individual information is different for each antenna port of the antenna modules for the collocated antenna groups.

6. The UE of claim 3, wherein:

the processor is further configured to identify a coefficient matrix tuple across antenna ports of the antenna modules to identify a concatenated matrix of the coefficient matrix tuple;

the concatenated matrix is represented as a sum of coefficient basis vectors and corresponding coefficients; and the CSI report includes the coefficient basis vectors and the corresponding coefficients.

7. The UE of claim 2, wherein:

the processor is further configured to identify, for each of the collocated antenna groups, based on an antenna module domain and a subband domain for respective antenna port of each type of the antenna modules, a channel coefficient matrix for multiple antenna modules; and the channel coefficient matrix comprises:
a matrix indicating an antenna domain (AD) basis that includes AD basis vectors for each type of the antenna modules,
a matrix indicating a frequency domain (FD) basis that includes FD basis vectors for each type of the antenna modules, and
a matrix indicating coefficients corresponding to pairs of the AD and FD basis vectors for each type of the antenna modules.

8. The UE of claim 1, wherein:

the processor is further configured to identify an inter-collocated group coefficient component comprising an inter-collocated group phase component and an inter-collocated group amplitude component;

the inter-collocated group phase component is determined as a value based on the number of collocated antenna groups and a reference value that is set to one;

the inter-collocated group amplitude component is determined as a value based on the number of collocated antenna groups and the reference value that is set to one;

the transceiver is further configured to transmit, to the base station, the inter-collocated group phase and amplitude components for at least one of a wideband (WB) component or a subband (SB) component;

the WB component comprises a value that is reported for all SBs in a frequency band configured for the CSI report; and the SB component comprises a value that is reported for each SB in the frequency band configured for the CSI report.

9. A method of a user equipment (UE) in a wireless communication system, the method comprising:

identifying configuration information of an antenna system including antenna modules for a multi-input multi-output (MIMO) operation;

identifying, based on the configuration information, a number of collocated antenna groups that each includes one or more of the antenna modules;

identifying, based on the configuration information, a number of the antenna modules for each type of the antenna modules in each of the collocated antenna groups, wherein each of the collocated antenna groups includes one or more types of the antenna modules;

generating a channel state information (CSI) report for one or more of the collocated antenna groups in the antenna system; and transmitting, to a base station (BS), the CSI report.

10. The method of claim 9, further comprising identifying, for each of the collocated antenna groups, based on an antenna module domain and a subband domain for respective antenna port of the antenna modules, a channel coefficient matrix for multiple antenna modules, wherein the channel coefficient matrix comprises:
a first matrix indicating an antenna domain (AD) basis that includes AD basis vectors,
a second matrix indicating a frequency domain (FD) basis that includes FD basis vectors, and
a third matrix indicating coefficients corresponding to pairs of the AD and FD basis vectors.

11. The method of claim 10, further comprising:

selecting the first matrix from a set of oversampled discrete Fourier transform (DFT) vectors; and reporting, to a base station, common information and individual information on an AD basis matrix tuple, associated with the first matrix, across antenna ports of the antenna modules, wherein the common information is a same for multiple antenna ports of the antenna modules, and wherein the individual information is different for each antenna port of the antenna modules.

12. The method of claim 10, further comprising:

selecting the second matrix from a set of oversampled discrete Fourier transform (DFT) vectors;

reporting, to the base station, common information and individual information on an FD basis matrix tuple, associated with the second matrix, across antenna ports of the antenna modules for the collocated antenna groups, wherein the common information is a same for multiple antenna ports of the antenna modules for the collocated antenna groups and the individual information is different for each antenna port of the antenna modules for the collocated antenna groups; and identifying a coefficient matrix tuple across antenna ports of the antenna modules to identify a concatenated matrix of the coefficient matrix tuple, wherein the concatenated matrix is represented as a sum of coefficient basis vectors and corresponding coefficients, and wherein the CSI report includes the coefficient basis vectors and the corresponding coefficients.

13. The method of claim 9, further comprising identifying, for each of the collocated antenna groups, based on an antenna module domain and a subband domain for respective antenna port of each type of the antenna modules, a channel coefficient matrix for multiple antenna modules, wherein the channel coefficient matrix comprises:
a matrix indicating an antenna domain (AD) basis that includes AD basis vectors for each type of the antenna modules;
a matrix indicating a frequency domain (FD) basis that includes FD basis vectors for each type of the antenna modules; and
a matrix indicating coefficients corresponding to pairs of the AD and FD basis vectors for each type of the antenna modules, and wherein a collocated antenna group includes at least two types of antenna modules comprising a first module with a first type of antenna module and a second module with a second type of antenna module.

14. The method of claim 9, further comprising:
identifying an inter-collocated group coefficient component comprising an inter-collocated group phase component and an inter-collocated group amplitude component,
wherein:
the inter-collocated group phase component is determined as a value based on the number of collocated antenna groups and a reference value that is set to one, and
the inter-collocated group amplitude component is determined as a value based on the number of collocated antenna groups and the reference value that is set to one; and
reporting, to the base station, the inter-collocated group phase and amplitude components for at least one of a wideband (WB) component or a subband (SB) component, wherein:
the WB component comprises a value that is reported for all SBs in a frequency band configured for the CSI report, and
the SB component comprises a value that is reported for each SB in the frequency band configured for the CSI report.

15. A base station (BS) in a wireless communication system, the BS comprising:
a processor configured to generate configuration information of an antenna system including antenna modules for a multi-input multi-output (MIMO) operation; and
a transceiver operably coupled to the processor, the transceiver configured to:
transmit, to a user equipment (UE), the configuration information of the antenna system including the antenna modules for the MIMO operation, and
receive, from the UE, a channel state information (CSI) report for one or more of collocated antenna groups in the antenna system,
wherein:
a number of the collocated antenna groups that each includes one or more of the antenna modules is identified based on the configuration information, and
a number of the antenna modules for each type of the antenna modules in each of the collocated antenna groups is identified based on the configuration information, each of the collocated antenna groups including one or more types of the antenna modules.

16. The BS of claim 15, wherein, for each of the collocated antenna groups, based on an antenna module domain and a subband domain for respective antenna port of the antenna modules, a channel coefficient matrix for multiple antenna modules is identified, and wherein the channel coefficient matrix comprises:
a first matrix indicating an antenna domain (AD) basis that includes AD basis vectors,
a second matrix indicating a frequency domain (FD) basis that includes FD basis vectors, and
a third matrix indicating coefficients corresponding to pairs of the AD and FD basis vectors.

17. The BS of claim 16, wherein:
the transceiver is further configured to receive, from the UE, a reporting message including common information and individual information on an AD basis matrix tuple, associated with the first matrix, across antenna ports of the antenna modules;
the common information is a same for multiple antenna ports of the antenna modules;
the individual information is different for each antenna port of the antenna modules; and
the first matrix is selected from a set of oversampled discrete Fourier transform (DFT) vectors.

18. The BS of claim 16, wherein:
the transceiver is further configured to receive a reporting message, from the UE, common information and individual information on an FD basis matrix tuple, associated with the second matrix, across antenna ports of the antenna modules for the collocated antenna groups;
the common information is a same for multiple antenna ports of the antenna modules for the collocated antenna groups;
the individual information is different for each antenna port of the antenna modules for the collocated antenna groups;
the second matrix is selected from a set of oversampled discrete Fourier transform (DFT) vectors;
a coefficient matrix tuple across antenna ports of the antenna modules to identify a concatenated matrix of the coefficient matrix tuple is identified;
the concatenated matrix is represented as a sum of coefficient basis vectors and corresponding coefficients; and
the CSI report includes the coefficient basis vectors and the corresponding coefficients.

19. The BS of claim 15, wherein:
for each of the collocated antenna groups, based on an antenna module domain and a subband domain for respective antenna port of each type of the antenna modules, a channel coefficient matrix for multiple antenna modules is identified; and
the channel coefficient matrix comprises:
a matrix indicating an antenna domain (AD) basis that includes AD basis vectors for each type of the antenna modules,
a matrix indicating a frequency domain (FD) basis that includes FD basis vectors for each type of the antenna modules, and
a matrix indicating coefficients corresponding to pairs of the AD and FD basis vectors for each type of the antenna modules,
wherein a collocated antenna group includes at least two types of antenna modules comprising a first module with a first type of antenna module and a second module with a second type of antenna module.

20. The BS of claim 15, wherein:
the transceiver is further configured to receive, from the UE, an inter-collocated group phase and amplitude components for at least one of a wideband (WB) component or a subband (SB) component, the WB component comprising a value that is reported for all SBs in a frequency band configured for the CSI report and the SB component comprising a value that is reported for each SB in the frequency band configured for the CSI report;
an inter-collocated group coefficient component comprises the inter-collocated group phase component and an inter-collocated group amplitude component is identified;
the inter-collocated group phase component is determined as a value based on the number of collocated antenna groups and a reference value that is set to one; and
the inter-collocated group amplitude component is determined as a value based on the number of collocated antenna groups and the reference value that is set to one.

* * * * *